US009391980B1

(12) United States Patent
Krahn et al.

(10) Patent No.: US 9,391,980 B1
(45) Date of Patent: Jul. 12, 2016

(54) ENTERPRISE PLATFORM VERIFICATION (71) Applicant: Google Inc., Mountain View, CA (US)

(72) Inventors: Darren Krahn, Cupertino, CA (US); Sumit Gwalani, Mountain View, CA (US); William Alexander Drewry, Nashville, TN (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/077,120

(22) Filed: Nov. 11, 2013

(51) Int. Cl.
*H04L 9/32* (2006.01)
*H04L 29/06* (2006.01)

(52) U.S. Cl.
CPC .................................. *H04L 63/0823* (2013.01)

(58) Field of Classification Search
CPC ........................................................ H04L 9/32
See application file for complete search history.

(56) References Cited

U.S. PATENT DOCUMENTS

| | | | |
|---|---|---|---|
| 7,254,707 B2 | 8/2007 | Herbert et al. | |
| 8,312,528 B2 | 11/2012 | Saarepera et al. | |
| 8,881,257 B2* | 11/2014 | Cha | G06F 21/335 726/10 |
| 2007/0180519 A1* | 8/2007 | Boccon-Gibod et al. | 726/21 |
| 2007/0226492 A1* | 9/2007 | Peinado et al. | 713/164 |
| 2010/0138905 A1* | 6/2010 | Kass | 726/7 |
| 2011/0191579 A1* | 8/2011 | Xiao et al. | 713/156 |
| 2011/0296172 A1 | 12/2011 | Fu et al. | |
| 2012/0023568 A1* | 1/2012 | Cha et al. | 726/10 |
| 2012/0137364 A1 | 5/2012 | Blaisdell | |
| 2013/0145154 A1 | 6/2013 | Kim et al. | |

OTHER PUBLICATIONS

BARE, "Attestation and Trusted Computing," Mar. 2006, available at: <https://www.cs.washington.edu/education/courses/csep590/06wi/finalprojects/bare.pdf>, last visited Aug. 22, 2013.
"TPM Main Part 1 Design Principles," Mar. 1, 2011, Specification Version 1.2, Revision 116, TCG Published <http://www.trustedcomputinggroup.org/files/static_page_files/72C26AB5-1A4B-B294-D002BC0B8C062FF6/TPM%20Main-Part%201%20Design%20Principles_v1.2_rev116_01032011.pdf>.
Harn, et al., "Generalized Digital Certificate for User Authentication and Key Establishment for Secure Communications," IEEE Transactions on Wireless Communications, Jul. 2011, pp. 2372-2379, vol. 10, No. 7.

\* cited by examiner

*Primary Examiner* — Josnel Jeudy
(74) *Attorney, Agent, or Firm* — McDermott Will & Emery LLP (57) ABSTRACT

Systems and methods for enterprise platform verification are provided. In some aspects, a computing device includes a trusted platform module (TPM). The TPM includes an endorsement key (EK) physically embedded in the TPM. The TPM includes an attestation identity key (AIK), the AIK being used to verify that at least one TPM-protected key different from the EK and different from the AIK is generated at the TPM and is non-migratable. The TPM includes an enterprise machine key (EMK), the EMK being certified by the AIK, the EMK being uniquely associated with the client computing device, and the EMK being generated during enrollment of the client computing device with an enterprise and remaining active until a factory reset of the client computing device.

20 Claims, 6 Drawing Sheets

ENTERPRISE PLATFORM VERIFICATION

BACKGROUND

The subject technology is generally directed to platform verification or remote attestation of a client computing device.

Enterprises and other organizations may wish to verify the integrity of client computing devices used, for example, by employees, to access resources of the enterprises or other organizations. Known integrity verification techniques, which include for example, having an administrator physically access and verify the integrity of the client computing device, are cumbersome and may be intrusive of the user's privacy. As the foregoing illustrates, a new approach for platform verification or remote attestation of the computing device may be desirable.

SUMMARY

In some aspects, the disclosed subject matter relates to a client computing device. The client computing device includes one or more processors and a memory. The client computing device includes a trusted platform module (TPM) residing on a separate application-specific integrated circuit (ASIC) from the one or more processors and from the memory. The TPM stores an endorsement key (EK) physically embedded in the TPM. The TPM stores an attestation identity key (AIK), the AIK being used to verify that at least one TPM-protected key different from the EK and different from the AIK is generated at the TPM and is non-migratable. The TPM stores an enterprise machine key (EMK), the EMK being certified by the AIK, the EMK being uniquely associated with the client computing device, and the EMK being generated during enrollment of the client computing device with an enterprise and remaining active until a factory reset of the client computing device. The TPM stores one or more enterprise user keys (EUKs), each EUK being certified by the AIK, each EUK being associated with the client computing device, and each EUK being associated with a user account of the client computing device and remaining active until the associated user account is removed from the client computing device. The memory includes a platform verification or module. The platform verification or module stores instructions for receiving, via an application server, a request for platform verification of the client computing device and processing the request. The platform verification module stores instructions for providing, in response to the request for platform verification, identifying information of the EMK to a platform verification server while foregoing providing the identifying information of the EMK to the application server.

In some aspects, the disclosed subject matter relates to a method implemented at a platform verification server. The method includes receiving, at the platform verification server and from an application server, a request for platform verification of a client computing device. The method includes transmitting, from the platform verification server to the client computing device, in response to the request for platform verification, a request that the client computing device provide identifying information of an enterprise machine key (EMK) of the client computing device to the platform verification server. The method includes receiving, at the platform verification server and from the client computing device, the identifying information of the EMK. The method includes verifying, using a certificate associated with the client computing device and stored at the platform verification server, whether the EMK of the client computing device is valid. The method includes providing, from the platform verification server to the application server, an indication that the platform verification of the client computing device is successful in a case where the EMK of the client computing device is valid. The method includes providing, from the platform verification server to the application server, an indication that the platform verification of the client computing device is unsuccessful in a case where the EMK of the client computing device is invalid.

In some aspects, the disclosed subject matter relates to a non-transitory computer-readable medium encoded with executable instructions. The instructions include code for receiving, at a platform verification server and from an application server, a request for platform verification of a client computing device. The instructions include code for receiving, at the platform verification server and from the client computing device, identifying information of an enterprise machine key (EMK) of the client computing device. The instructions include code for verifying, using a certificate associated with the client computing device and stored at the platform verification server, whether the EMK of the client computing device is valid. The instructions include code for providing, from the platform verification server to the application server, an indication that the platform verification of the client computing device is successful in a case where the EMK of the client computing device is valid, while foregoing providing the identifying information of the EMK to the application server. The instructions include code for providing, from the platform verification server to the application server, an indication that the platform verification of the client computing device is unsuccessful in a case where the EMK of the client computing device is invalid, while foregoing providing the identifying information of the EMK to the application server.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The subject technology provides approaches for platform verification or remote attestation of a client computing device. For example, an enterprise (or any other organization) may use the techniques described herein to verify that a user (e.g., an employee) who is trying to use a client computing device to access an enterprise resource is using a legitimate client computing device, which has valid hardware and/or a valid operating system (e.g., an operating system acknowledged by a specified operating system developer as being valid) on the client computing device, and that the user is accessing the client computing device using a valid enterprise user account.

Enterprises or other organization may wish to verify the integrity of computing devices used by users to access enterprise resources. Thus, a platform verification or remote attestation solution, that allows a remote computing device to prove information about itself (e.g., that the remote computing device has a valid version of its operating system that is approved by a developer of the operating system) may be desirable.

As described herein, computing devices are capable of platform verification or remote attestation. The computing devices may prove that they are legitimate computing devices running legitimate operating system(s) approved by developer(s). In some examples, this proof may be completed in the context of an asymmetric key pair—a remote server is assured that a private key in the asymmetric key pair is held by a computing device with a legitimate operating system. Two different keys may be used—a machine key or a user key— for example, an enterprise machine key or an enterprise user key, as described below.

A machine key may be associated with the computing device and may live as long as the trusted platform module (TPM) owner. A certificate of the machine key includes a unique device identifier. The machine key may be generated automatically and the certificate is automatically uploaded to a device management server. An enterprise application may challenge the machine key to establish that the device is running a valid version of its operating system and it is enrolled with the enterprise.

A user key may be associated with a user of the computing device and may live as long as the user account is on the computing device. The certificate of the user key includes no identifying information. The user key is generated on demand, as explained below, and the certificate of the user key is provided on request. An enterprise application may challenge the user key to establish that the user is signed in to a device running a valid version of its operating system and operating in an allowed mode. In some examples, the user key can be used in a "bring your own device" scenario since the device does not need to be enrolled with or owned by the enterprise. The user key is available for repurposing, to the degree that the user key may be decoupled from its role or assigned a new role. For example, if a user switches jobs, he/she may keep the same user key and the same user key may be associated with different enterprises at different times. An enterprise application may also consume and assign any number of keys to a user.

An enterprise administrator may control the following policies: enable/disable feature(s) for device(s) owned by and enrolled to the enterprise; enable/disable feature(s) for user account(s) owned by the enterprise (across all devices having the user account(s)); control which application(s) can access the feature(s) through extension application programming interfaces (APIs) of the operating system (the policies for access off feature(s) may be associated with user account(s) or device(s)); and control which user(s) may operate in verified mode and which user(s) may operate in developer mode.

According to some examples, the unique device identifier in the machine key is never available to enterprise application(s) and is only available to the device management server. An enterprise may deploy third-party application(s) that leverage this feature without sharing device-identifying information.

Figure 1:
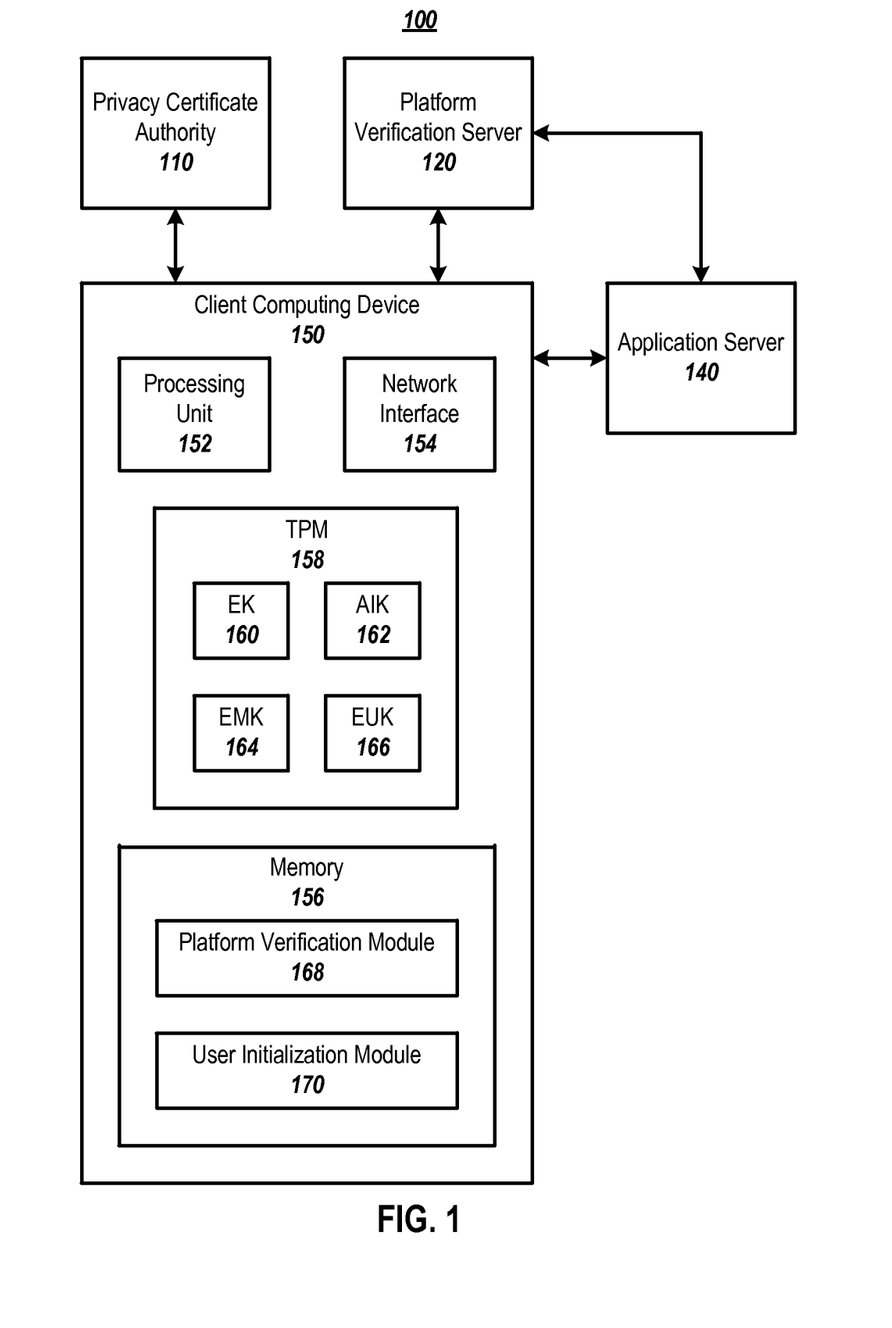
FIG. 1 illustrates an example system for platform verification.

FIG. 1 illustrates an example system 100 for platform verification. As shown, the system 100 includes a privacy certificate authority 110, a platform verification server 120, an application server 140, and a client computing device 150. The computing machines 110, 120, 140, and 150 communicate with one another over one or more networks, for example, the Internet, a local area network, a wide area network, a virtual private network (VPN), an intranet, etc. While the system 100 of FIG. 1 is described in an enterprise context, the subject technology may be implemented in conjunction with any other organization in place of an enterprise.

As shown, the client computing device 150 includes a processing unit 152, a network interface 154, a trusted platform module (TPM) 158, and a memory 156. The processing unit 152 includes one or more processors. The processing unit 152 may include a central processing unit (CPU), a graphics processing unit (GPU), or any other processing unit. The processing unit 152 executes computer instructions that are stored in a computer-readable medium, for example, the memory 156. The network interface 154 allows the client computing device 150 to transmit and receive data in the one or more networks to communicate with the privacy certificate authority 110, the platform verification module 120, and the application server 140, among other machines. The memory 156 stores data and/or instructions. The memory 156 may be one or more of a cache unit, a storage unit, an internal memory unit, or an external memory unit. As illustrated, the memory 156 includes a platform verification module 168 and a user initialization module 170.

The TPM 158 may be a separate application-specific integrated circuit (ASIC) from the processing unit 152 and the memory 156. A communication interface may provide for communication between the TPM 158 and the processing unit 152. The communication interface may be, for example, low pin count (LPC), inter-integrated circuit (I2C), or serial peripheral interface (SPI). Alternatively, a "soft" TPM, implemented in operating system software of the memory 156 may be used or the TPM may be integrated with the processing unit 152 and may reside on the same ASIC as the processing unit 152. The TPM 158 includes an endorsement key (EK) 160, an attestation identity key (AIK) 162, an enterprise machine key (EMK) 164, and an enterprise user key (EUK) 166.

The EK 160 is physically and permanently embedded in the TPM 158. The EK 160 is generated in the factory of the manufacturer of the client computing device 150 and certified by the manufacturer. The EK 160 resides in the TPM 158 of the client computing device 150 for the lifetime of the TPM 158.

The AIK 162 is a TPM-protected key that is activated by the EK 160 and is used to certify other TPM-generated non-migratable keys. The AIK 162 is certified by the privacy certificate authority 110, which may be associated with a manufacturer of the client computing device 150. The AIK 162 is generated when TPM 158 ownership is taken, in other words when the client computing device 158 is placed in service by a user. The AIK 162 is activated when platform verification is first enabled and used. In some cases, not every TPM-protected key is certifiable by the AIK 162. However, for a key (e.g., a key different from the EK) that is generated by the TPM 158 and non-migratable, the AIK 162 may be used to verify that the key is generated by the TPM 158 and non-migratable. The AIK 162 remains active until the TPM 158 owner is cleared. In some examples, the AIK 162 is generated during initial setup of the client computing device 150 by the user, for example, when the user take the client computing device 150 out of the box and begins using the client computing device 150. The AIK 162 may be generated using a TPM owner privilege of the TPM 158, which is accessible via a TPM owner password. The TPM owner password may be deleted after the initial setup of the client computing device 150. In some cases, the AIK is used to verify that each and every TPM-protected key different from the EK and different from the AIK is generated at the TPM and is non-migratable.

The EMK 164 is certified by the AIK 162 and is uniquely associated with the client computing device 150. The EMK 164 is generated in the TPM 158 during enterprise enrollment, for example, when the client computing device 150 is registered with an enterprise or granted permission to access enterprise resources (e.g., enterprise data stored on a network or an enterprise network). The EMK 164 is certified by the AIK 162 and the privacy certificate authority 110. The EMK 164 remains active as long as the client computing device 150 is enrolled with the enterprise, in other words, until a factory reset of the client computing device 150.

While a single EUK 166 is illustrated in FIG. 1, the subject technology may be implemented with one or multiple EUKs 166. Each EUK 166 is generated on demand in the TPM 158, in other words, each EUK may be generated when a user of the client computing device 150 attempts to register with the enterprise or access enterprise data, information, or service(s). Each EUK may be generated in response to an attempt, by a user of the client computing device 150, to access an enterprise resource via the client computing device 150. Similarly to the EMK 164, each EUK 166 is certified by the AIK 162 and the privacy certificate authority 110. Each EUK 166 is associated with a single device, the client computing device 150, and a single user account of the device. However, a user account on a device, such as the client computing device 150, may have multiple EUKs 166. For example, the same user account on a non-enterprise computer belonging to a user may have an EUK 166 for accessing enterprise data of a business where the user is employed and an EUK 166 for accessing data of a volunteer organization where the user volunteers. EUK(s) 166 associated with a user account at the client computing device 150 may be destroyed when the user account is removed from the client computing device 150 and remain active until the associated user account is removed from the client computing device 150.

The memory 156 includes the platform verification module 168 and the user initialization module 170.

The platform verification module 168 stores instructions for receiving, via the application server 140 (e.g., a corporate virtual private network (VPN) server), a request for platform verification of the client computing device 150 and processing the request. The platform verification module 168 stores instructions for providing, in response to the request for platform verification, identifying information of the EMK 164 and/or identifying information of the EUK 166 to the platform verification server 120, while foregoing providing the identifying information of the EMK 164 and/or the identifying information of the EUK 166 to the application server 140. The identifying information may include information from the EMK 164 and/or the EUK 166, a certificate, or a proof-of-possession of the EMK 164 and/or the EUK 166. The proof-of-possession may be a digital signature of a challenge string. As a result, secure private, and identifying information of the client computing device 150, which is associated with the EMK 164 or the EUK 166 is not shared with the application server 140 and is only shared with the platform verification server 120, which may be associated with the enterprise. As a result of the platform verification server 120 being associated with the enterprise, private information of the client computing device 150 may stay within the enterprise and not be shared outside the enterprise. The platform verification server 120 notifies the application server 140 regarding whether the platform verification of the client computing device 150 was successful, for example, via a Boolean message, where TRUE means successful and FALSE means unsuccessful, or vice versa. The operation of the client computing device 150 when executing the platform verification module 168 is described in greater detail in conjunction with FIG. 2.

The user initialization module 170 stores instructions for receiving an indication of a user initialization of the client computing device 150. For example, a user who recently purchased the client computing device 150 may turn on the client computing device and attempt to initialize the computing device 150 for his/her personal use. The user initialization module 170 stores instructions for reading the EK 160 upon receiving the indication of the user initialization. The user initialization module 170 stores instructions for generating the AIK 162 using a fake privacy certificate authority public key and the EK 160, as the client computing device 150 may not be connected to a network for accessing the privacy certificate authority 110. The user initialization module 170 stores instructions for generating data regarding a platform state of the client computing device 150 using the AIK 162. The user initialization module 170 stores instructions for connecting to a network for accessing the privacy certificate authority 110. The user initialization module 170 stores instructions for, after connecting to the network, certifying the AIK 162 to acquire an encrypted AIK certificate from the privacy certificate authority 110 over the network. The user initialization module 170 stores instructions for decrypting the encrypted AIK certificate. The operation of the client computing device 150 when executing when executing the user initialization module 170 is described in greater detail in conjunction with FIG. 3.

The platform verification server 120 includes instructions for receiving, from the application server 140, a request for platform verification of the client computing device 150. The platform verification server 120 includes instructions for transmitting, to the client computing device 150 in response to the request for platform verification, a request that the client computing device provide identifying information of the EMK 164 and/or the EUK 166 of the client computing device 150. The platform verification server 120 includes instructions for receiving, from the client computing device 150, the identifying information of the EMK 164 and/or the EUK 166. The platform verification server 120 includes instructions for verifying, using a certificate associated with the client computing device 150 and stored at the platform verification server 140, whether the EMK 164 and/or the EUK 166 of the client computing device is valid. The platform verification server 120 includes instructions for providing, to the application server 140, an indication (e.g., a Boolean indication) that the platform verification of the client computing device is successful if the EMK 164 and/or the EUK 166 is valid. The platform verification server 120 includes instructions for providing, to the application server 140, an indication (e.g., a Boolean indication) that the platform verification of the client computing device is unsuccessful if the EMK 164 and/or the EUK 166 is invalid. The operation of the platform verification server 120 is described in more detail in conjunctions with FIG. 4 and FIG. 5.

The privacy certificate authority 110 may be associated with a manufacturer of the client computing device 150. The privacy certificate authority 110 stores instructions for certifying the AIK 162, the EMK 164, and the EUK 166 of the client computing device 150. The privacy certificate authority 110 may store instructions for verifying that the client computing device 150 has a valid operating system associated with the manufacturer and for providing a certificate to this effect.

The application server 140 may host any application(s) that require verification of platform verification of the client computing device 150 for accessing the application(s). However, the client computing device 150 may not trust the application server 140 to provide information about TPM keys of the client computing device 150 to the application server 140. Thus, the client computing device may rely on the platform verification server 120 to implement platform verification of the client computing device 150 and to provide the result of the platform verification (e.g., as a Boolean value) to the application server 140.

Figure 2:
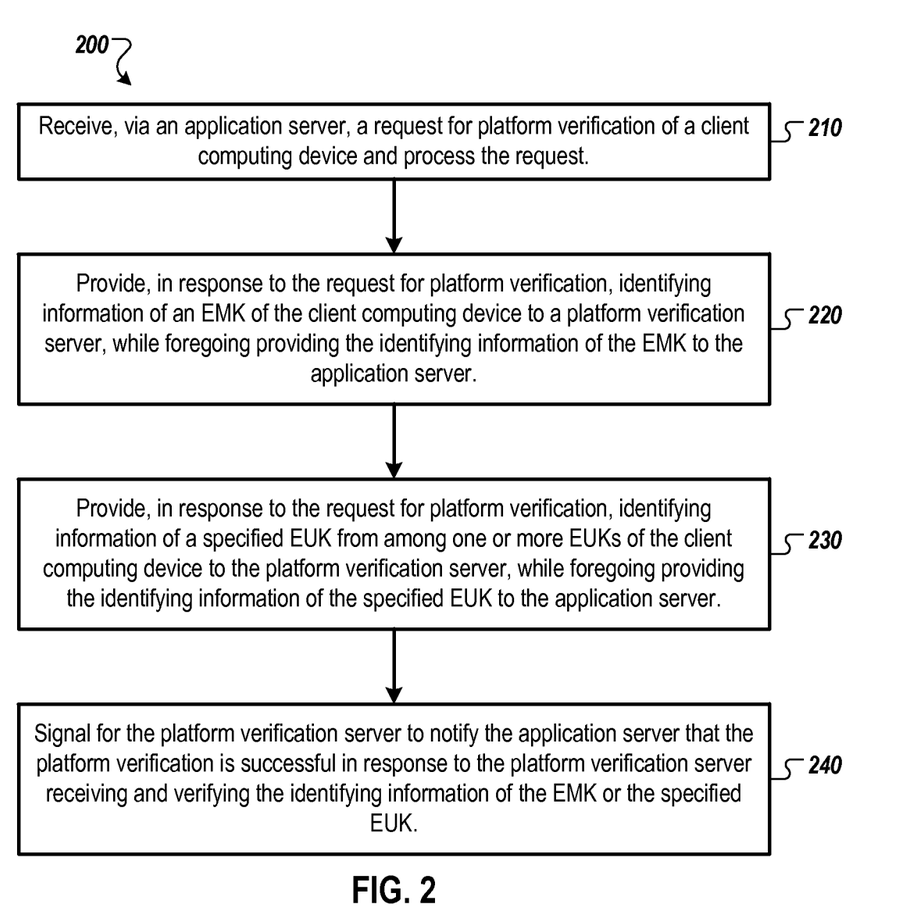
FIG. 2 illustrates an example process by which platform verification may be completed at a client computing device.

FIG. 2 illustrates an example process 200 by which platform verification may be completed at a client computing device.

The process 200 begins at step 210, where a client computing device (e.g., client computing device 150 executing platform verification module 168) receives, via an application server (e.g., application server 140) and processes a request for platform verification of the client computing device.

In step 220, the client computing device provides, in response to the request for platform verification, identifying information of an EMK (e.g., EMK 164) of the client computing device to a platform verification server (e.g., platform verification server 120). The client computing device foregoes providing the identifying information of the EMK to the application server. As a result, the privacy of the client computing device is ensured and the user of the client computing device is not required to trust the application server with the identifying information of the EMK. The identifying information of the EMK may include a certificate or a proof-of-possession of the EMK.

In step 230, the client computing device provides, in response to the request for platform verification, identifying information of a specified EUK (e.g., EUK 166 or a specified one of multiple EUKs stored at the client computing device) from among one or more EUKs of the client computing device to the remote attestation server. The client computing device foregoes providing the identifying information of the specified EUK to the application server. As a result, the privacy of the client computing device is ensured and the user of the client computing device is not required to trust the application server with the identifying information of the specified EUK. The identifying information of the specified EUK may include a certificate or a proof-of-possession of the specified EUK.

As illustrated in FIG. 2, both steps 220 and 230 are executed in the process 200. However, in some examples, the process 200 may skip either step 220 or step 230 and platform verification may be completed by providing the EMK and not the specified EUK or by providing the specified EUK and not the EMK.

In step 240, the client computing device signals for the platform verification server to notify the application server that the platform verification is successful in response to the platform verification server receiving and verifying the identifying information of the EMK or the specified EUK. The identifying information of the EMK or the specified EUK may not be provided to the application server, so as to protect the privacy of the client computing device and not to require the user of the client computing device to trust the application server with this identifying information. After step 240, the process 200 ends.

As illustrated in FIG. 2, the steps 210-240 of the process 200 are carried out in series and according to a specified order. However, the steps 210-240 of the process 200 may be carried out in any order and/or one or more of the steps 210-240 of the process 200 may be skipped. In some implementations, two or more of the steps 210-240 of the process 200 may be carried out in parallel.

The Trusted Computing Group (TCG) standard specifies an attestation identity certification process for TPMs which requires both an active connection (in some cases, over a network) with a privacy certificate authority (e.g., privacy certificate authority 110) and TPM owner privilege. In some operating systems, TPM owner privilege may only be available during initialization of the first user account, and the TPM owner password may be permanently destroyed after the initialization of the first user account. However, attestation identity certification may be a privacy sensitive operation requiring user and administrator consent. As the foregoing illustrates, a new approach for initializing a client computing device that does not require a network connection during initialization but allows the client computing device to communicate with the privacy certificate authority may be desirable.

Figure 3:
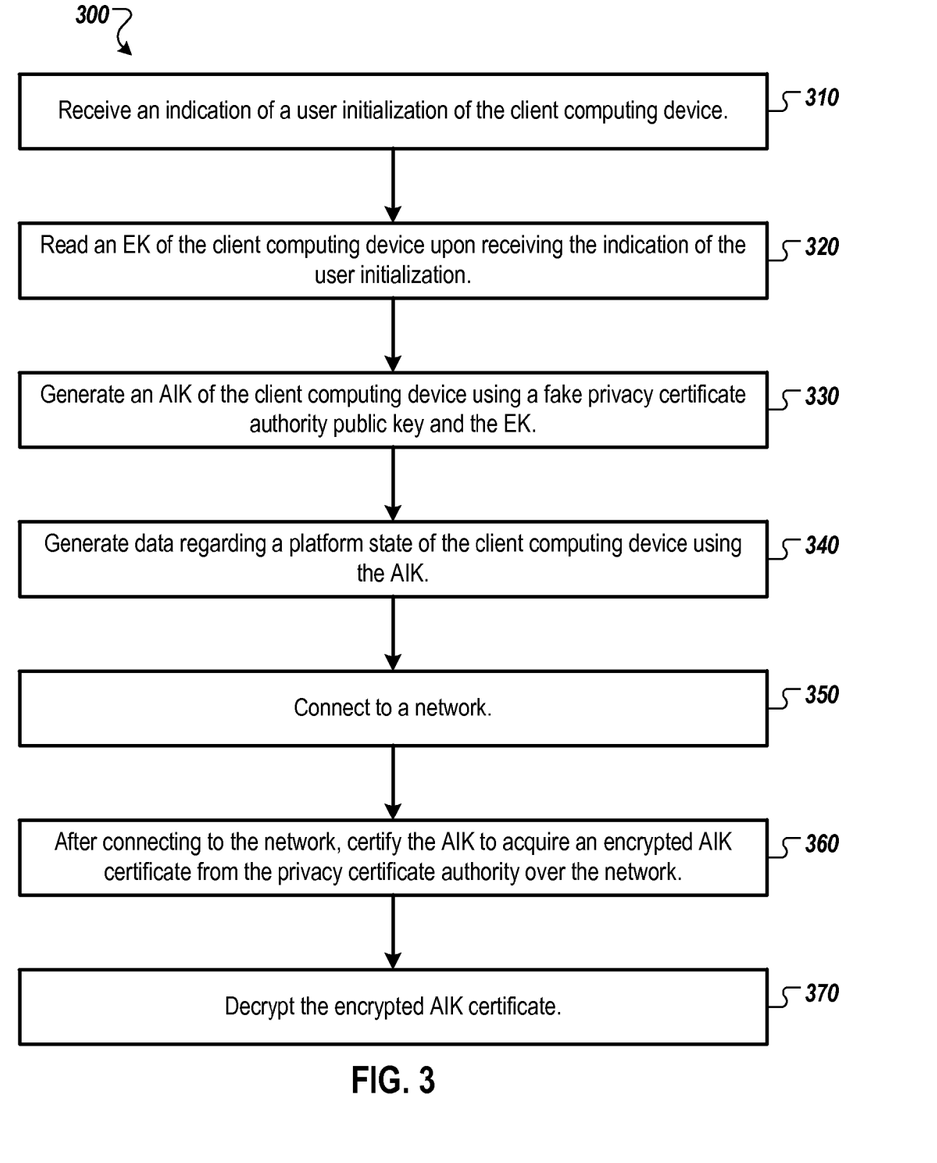
FIG. 3 illustrates an example process by which a client computing device may be initialized for a user.

FIG. 3 illustrates an example process 300 by which a client computing device may be initialized for a user.

The process 300 begins at step 310, where a client computing device (e.g., client computing device 150 executing user initialization module 170) receives an indication of a user initialization of the client computing device. For example, a user of the client computing device who recently purchased the client computing device may turn on the client computing device and begin initializing the client computing device for his/her personal or business use. When the client computing device receives the indication of the user initialization of the client computing device, the client computing device may not be connected to a network, as the user may not yet have selected a network to access or provided credentials (e.g., a password) for accessing the network.

In step 320, the client computing device reads an EK (e.g., EK 160) of the client computing device upon receiving the indication of the user initialization in step 310. The client computing device may not yet be connected to the network.

In step 330, the client computing device generates an AIK (e.g., AIK 162) of the client computing device using a fake privacy certificate authority public key and the EK. The client computing device may use the fake privacy certificate authority public key, as the client computing device may not yet be able to access the real public key of the privacy certificate authority (e.g., privacy certificate authority 110) due to the lack of the network connection at the client computing device.

In step 340, the client computing device generates data regarding a platform state of the client computing device using the AIK. For example, the client computing device may generate an EMK (e.g., EMK 164) or an EUK (e.g., EUK 166). The generated data may be stored at the client computing device. The client computing device may not yet be connected to the network.

After steps 310-340 are completed, the data stored at the client computing device may include: the EK public key and certificate, encrypted with the real privacy certificate authority public key at the time of manufacture of the client computing device; AIK public key; AIK private key as a TPM-wrapped blob; fake privacy certificate authority public key used to generate the AIK.

In step 350, the client computing device connects to the network. For example, the user of the client computing device may select a WiFi network and enter credentials (e.g., a password) for accessing the WiFi network or insert and activate a subscriber identity module (SIM) card for accessing a cellular network.

In step 360, after connecting to the network, the client computing device certifies the AIK to acquire an encrypted AIK certificate from the privacy certificate authority (e.g., privacy certificate authority 110) over the network. As a result, the AIK may be based on the real privacy certificate authority public key, rather than the fake privacy certificate authority public key, as in step 330.

In step 370, the client computing device decrypts the encrypted AIK certificate. Any data regarding the platform state of the client computing device, for example the EMK or the EUK, may be modified responsive to the certification of the AIK by the privacy certificate authority. After step 370, the process 300 ends.

As set forth above, steps 310-340 may require TPM-owner privilege and may be completed without a network connection for accessing the privacy certificate authority. However, steps 360-370 may, in some cases, be completed without TPM-owner privilege. Steps 360-370 may be completed when privacy policies and configuration have full control. The approach described in FIG. 3 provides a clean separation of tasks independent of the privacy certificate authority (steps 310-340) and tasks dependent on access to the privacy certificate authority (steps 360-370).

As illustrated in FIG. 3, the steps 310-370 of the process 300 are carried out in series and according to a specified order. However, the steps 310-370 of the process 300 may be carried out in any order and/or one or more of the steps 310-370 of the process 300 may be skipped. In some implementations, two or more of the steps 310-370 of the process 300 may be carried out in parallel. Using the techniques described herein, privacy issues may be controlled at the same time as TPM owner security may be enforced.

Figure 4:
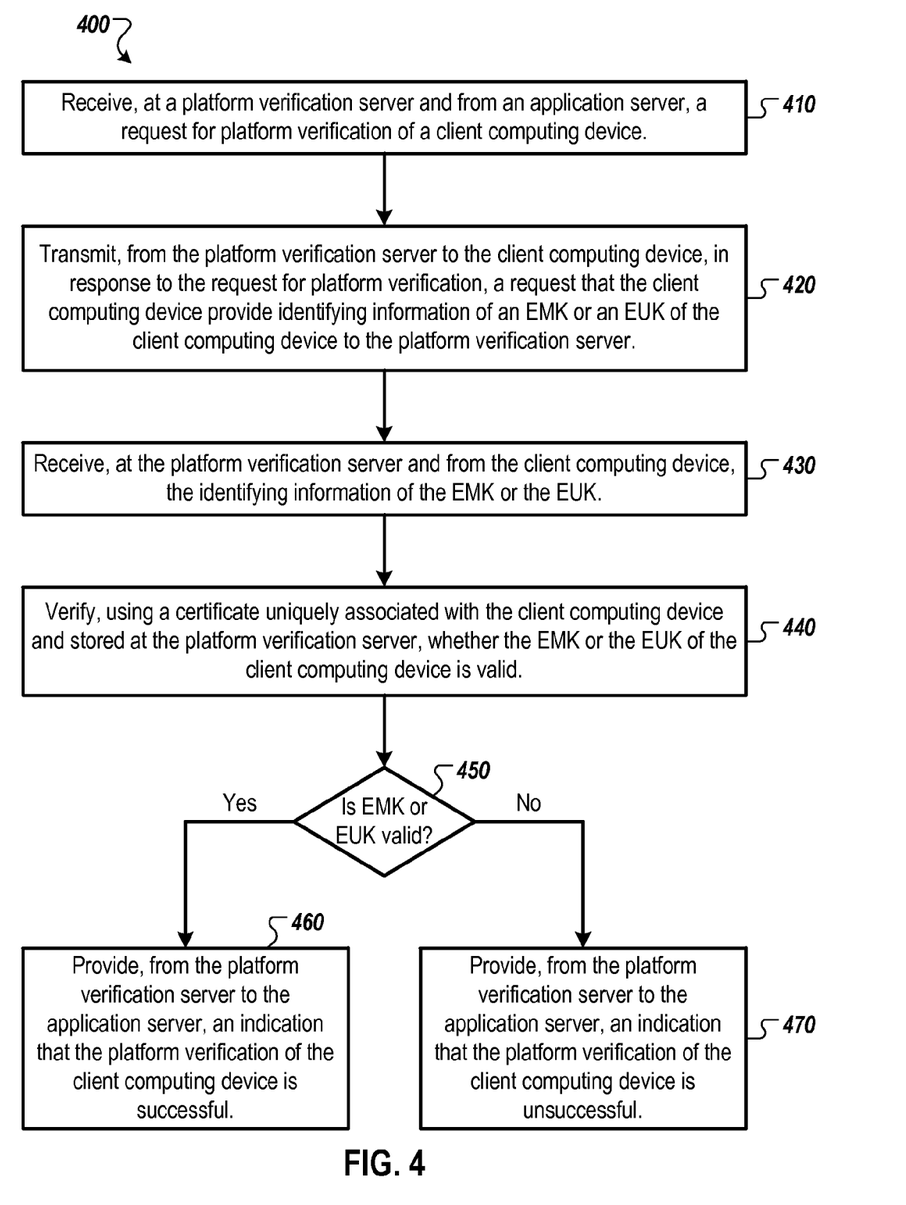
FIG. 4 illustrates an example process by which platform verification of a client computing device may be completed at a platform verification server.

FIG. 4 illustrates an example process 400 by which platform verification of a client computing device may be completed at a platform verification server.

The process 400 begins at step 410, where a platform verification server (e.g., platform verification server 120) receives, from an application server (e.g., application server 140), a request for platform verification of a client computing device (e.g., client computing device 150). The platform verification server may be associated with an enterprise with which the client computing device is registered, for example, an employer of the user of the client computing device. The user may register the client computing device with the platform verification server, for example, to access resources (e.g., files, network connections, etc.) of the employer at the application server.

In step 420, the platform verification server transmits, to the client computing device, in response to the request for platform verification, a request that the client computing device provide identifying information of an EMK (e.g., EMK 164) or an EUK (e.g., EUK 166) of the client computing device to the platform verification server.

In step 430, the platform verification server receives, from the client computing device, the identifying information of the EMK or the EUK. The identifying information of the EMK or the EUK may include a certificate or a proof-of-possession of the EMK or the EUK.

In step 440, the platform verification server verifies, using a certificate uniquely associated with the client computing device and stored at the platform verification server, whether the EMK or the EUK of the client computing device is valid.

In step 450, if the EMK or the EUK is valid, the process 400 continues to step 460. If the EMK or the EUK is invalid, the process 400 continues to step 470.

In step 460, if the EMK or the EUK is valid, the platform verification server provides, to the application server, an indication that the platform verification of the client computing device is successful. The platform verification server may forego providing the identifying information of the EMK or the EUK to the application server, as the application server may not be trusted to receive the identifying information. After step 460, the process 400 ends.

In step 470, if the EMK or the EUK is invalid, the platform verification server provides, to the application server, an indication that the platform verification of the client computing device is unsuccessful. The platform verification server may forego providing the identifying information of the EMK or the EUK to the application server, as the application server may not be trusted to receive the identifying information. After step 470, the process 400 ends.

According to some implementations, the indication that the platform verification of the client computing device is successful includes a first Boolean value, and the indication that the platform verification of the client computing device is unsuccessful includes a second Boolean value. For example, the first Boolean value may be TRUE, and the second Boolean value may be FALSE, or vice versa.

As illustrated in FIG. 4, the steps 410-470 of the process 400 are carried out in series and according to a specified order. However, the steps 410-470 of the process 400 may be carried out in any order and/or one or more of the steps 410-470 of the process 400 may be skipped. In some implementations, two or more of the steps 410-470 of the process 400 may be carried out in parallel.

Platform verification is used by a client computing device to prove claims about itself to a remote party. Services or components that are able to make use of keys (e.g., EK, AIK, EMK, or EUK) which belong to or are protected by a platform verification platform may be desirable.

A platform verification solution may include one or more asymmetric key pairs for which proofs exist which indicate that attested claims apply to the client computing device that owns the private keys. In a TPM, such a key is called a "certified key," as the key is provably generated by the TPM and is non-migratable. Part of the platform verification solution may be to send the proofs related to such a key along with a proof of possession (e.g., a digital signature) to a remote party in order to prove claims about the platform of the client computing device. A proof-of-possession artifact may be included as a payload of the attestation stage. The proof-of-possession artifact may be consumed by most certificate authority (CA) implementations as a certificate signing request, for example, using a signed public key and challenge (SPKAC). Once platform attestation has been verified, this artifact may be used to re-purpose the private key for another use. The new key usage may be completely unrelated to platform verification but may support cryptographic mechanisms for which the key was generated. For example, in some cases, if the key is a signing key, the key may not become an encryption key.

The repurposing includes the steps (1)-(5) summarized below and described in greater detail in FIG. 5. (1) Extract the SPKAC or similar artifact from the attestation payload data. (2) Present the artifact to a CA and receive a certificate for the new purpose. (3) Discard any existing certificate(s) and/or other metadata for the key that are no longer relevant. (4) Signal for the client computing device to discard any existing certificate(s) and/or other metadata for the key that are no longer relevant. (5) Optionally, send the new certificate to the client computing device for installation at the client computing device. Importantly, using the solution described herein, a service may leverage attested platform keys without being involved in the details of the platform verification. Furthermore, the proofs of the platform claims remain strong because the same key is used.

Figure 5:
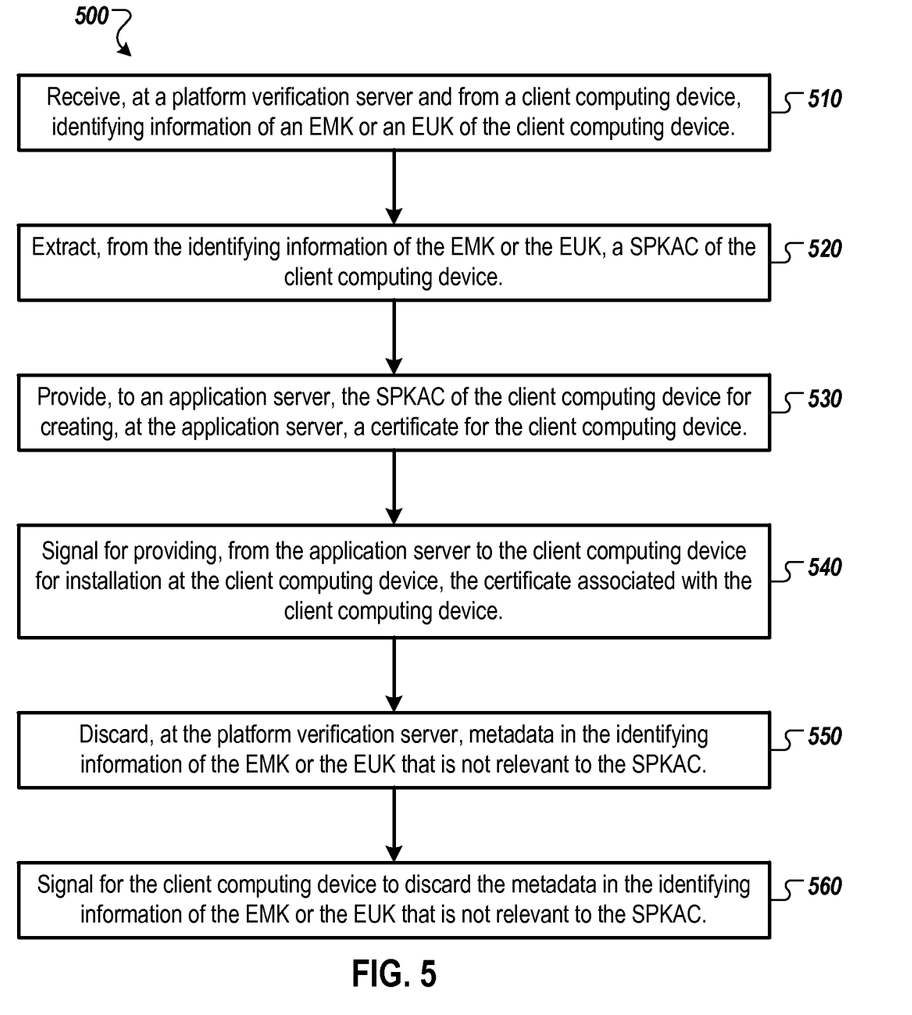
FIG. 5 illustrates an example process by which identifying information of trusted platform module-protected key of a client computing device may be used to generate a certificate.

FIG. 5 illustrates an example process 500 by which identifying information of trusted platform module-protected key of a client computing device may be used to generate a certificate.

The process 500 begins at step 510, where a platform verification server (e.g., platform verification server 120) receives, from a client computing device (e.g., client computing device 150), identifying information of an EMK (e.g., EMK 164) or an EUK (e.g., EUK 166) of the client computing device. The step 510 may correspond to the step 430 of the process 400 of FIG. 4.

In step 520, the platform verification server extracts, from the identifying information of the EMK or the EUK, a signed public key and challenge (SPKAC) of the client computing device.

In step 530, the platform verification server provides, to an application server (e.g., application server 140), the SPKAC of the client computing device for creating, at the application server, a certificate for the client computing device. The SPKAC may be provided to the application server together with an indication that the platform verification of the client computing device, processed at the platform verification server and based on the EMK or the EUK of the client computing device, is successful. The application server creates the certificate for the client computing device.

In step 540, the platform verification server signals for providing, from the application server to the client computing device for installation at the client computing device, the certificate associated with the client computing device. Alternatively, the certificate may be provided directly to the client computing device from the platform verification server.

In step 550, the platform verification server discards, from a memory of the platform verification server, metadata in the identifying information of the EMK or the EUK that is not relevant to the SPKAC.

In step 560, the platform verification server signals for the client computing device to discard the metadata in the identifying information of the EMK or the EUK that is not relevant to the SPKAC. In response, the client computing device may discard, from the memory of the client computing device, the metadata in the identifying information of the EMK or the EUK that is not relevant to the SPKAC. After step 560, the process 500 ends.

As illustrated in FIG. 5, the steps 510-560 of the process 500 are carried out in series and according to a specified order. However, the steps 510-560 of the process 500 may be carried out in any order and/or one or more of the steps 510-560 of the process 500 may be skipped. In some implementations, two or more of the steps 510-560 of the process 500 may be carried out in parallel.

Figure 6:
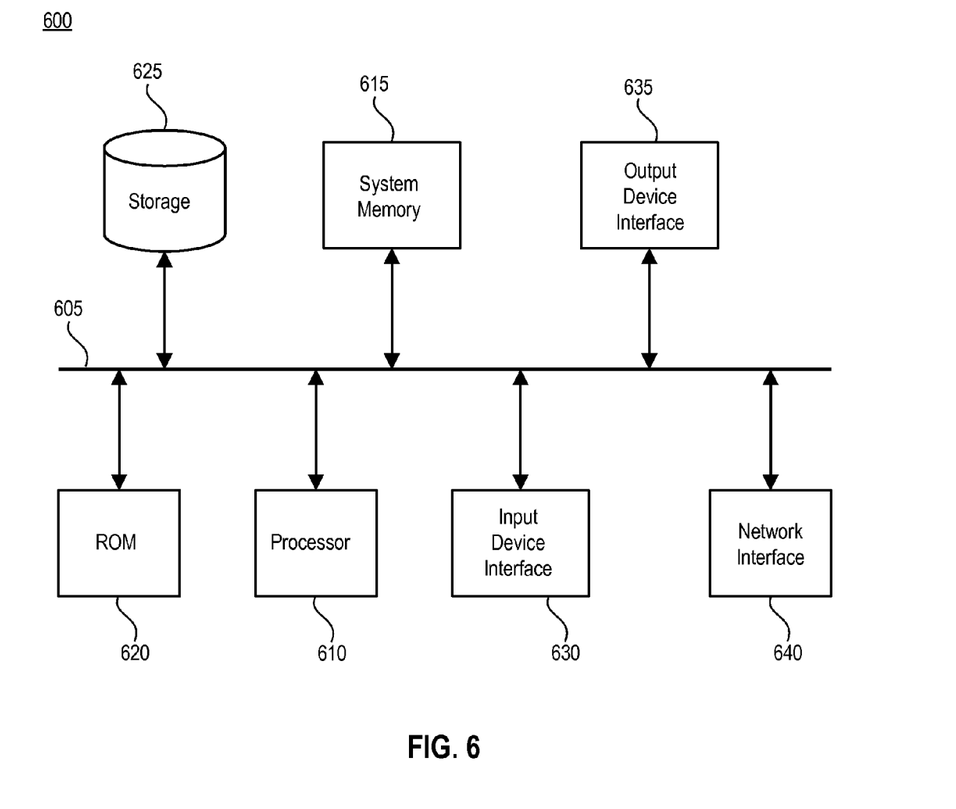
FIG. 6 conceptually illustrates an example electronic system with which some implementations of the subject technology are implemented.

FIG. 6 conceptually illustrates an electronic system 600 with which some implementations of the subject technology are implemented. For example, one or more of the privacy certificate authority 110, the platform verification server 120, the application server 140, or the client computing device 150 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for enterprise platform verification in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touch screen that functions as both input and output devices.

Finally, as shown in FIG. 6, bus 605 also couples electronic system 600 to a network (not shown) through a network interface 640. In this manner, the electronic system 600 can be a part of a network of computers (for example a local area network (LAN), a wide area network (WAN), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A client computing device comprising:
   one or more processors;
   a memory; and
   a trusted platform module (TPM) residing on a separate application-specific integrated circuit (ASIC) from the one or more processors and from the memory, the TPM storing:
      an endorsement key (EK) physically embedded in the TPM;
      an attestation identity key (AIK), the AIK being used to verify that at least one TPM-protected key different from the EK and different from the AIK is generated at the TPM and is non-migratable;
      an enterprise machine key (EMK), the EMK being certified by the AIK, the EMK being uniquely associated with the client computing device, and the EMK being generated during enrollment of the client computing device with an enterprise and remaining active until a factory reset of the client computing device;
      one or more enterprise user keys (EUKs), each EUK being certified by the AIK, each EUK being associated with the client computing device, and each EUK being associated with a user account of the client computing device and remaining active until the associated user account is removed from the client computing device;
   the memory comprising a platform verification module, the platform verification module storing instructions for:
      receiving, via an application server, a request for platform verification of the client computing device and processing the request; and
      providing, in response to the request for platform verification, identifying information of the EMK to a platform verification server while foregoing providing the identifying information of the EMK to the application server.

2. The client computing device of claim 1, the platform verification module further storing instructions for:
   providing, in response to the request for platform verification, identifying information of a specified EUK from among the one or more EUKs to the platform verification server while foregoing providing the identifying information of the specified EUK to the application server.

3. The client computing device of claim 1, the platform verification module further storing instructions for:
   signaling for the platform verification server to notify the application server that the platform verification is successful in response to the platform verification server receiving the identifying information of the EMK.

4. The client computing device of claim 1, wherein the identifying information of the EMK comprises a certificate or a proof-of-possession of the EMK.

5. The client computing device of claim 1, wherein the AIK is activated by the EK and certified by a privacy certificate authority.

6. The client computing device of claim 1, wherein the AIK is generated during initial setup of the client computing device by a user, using a TPM owner privilege accessible via a TPM owner password, and wherein the TPM owner password is deleted after the initial setup of the client computing device.

7. The client computing device of claim 1, the memory further comprising a user initialization module, the user initialization module storing instructions for:

receiving an indication of a user initialization of the client computing device;

reading the EK upon receiving the indication of the user initialization;

generating the AIK using a fake privacy certificate authority public key and the EK;

generating data regarding a platform state of the client computing device using the AIK;

connecting to a network; and after connecting to the network:
- certifying the AIK to acquire an encrypted AIK certificate from the privacy certificate authority over the network; and
- decrypting the encrypted AIK certificate.

8. The client computing device of claim 7, wherein the receiving, reading, and two generating instructions are executed while the client computing device is not connected to the network.

9. The client computing device of claim 1, wherein the AIK is used to verify that each and every TPM-protected key different from the EK and different from the AIK is generated at the TPM and is non-migratable.

10. The client computing device of claim 1, wherein the one or more EUKs are generated in response to an attempt, by a user of the client computing device, to access an enterprise resource via the client computing device.

11. The client computing device of claim 1, wherein the EMK and the one or more EUKs are certified by the AIK and by a privacy certificate authority.

12. The client computing device of claim 1, wherein at least one user account of the client computing device is associated with a plurality of EUKs.

13. A method implemented at a platform verification server, the method comprising:

receiving, at the platform verification server and from an application server, a request for platform verification of a client computing device, the platform verification server being separate from the application server;

transmitting, from the platform verification server to the client computing device, in response to the request for platform verification, a request that the client computing device provide identifying information of an enterprise machine key (EMK) of the client computing device to the platform verification server, wherein the client computing device comprises a trusted platform module (TPM) storing an endorsement key (EK), an attestation identity key (AIK), the EMK, and an enterprise user key (EUK), the EMK being certified by the AIK, the EUK being certified by the AIK and associated with a user account of the client computing device;

receiving, at the platform verification server and from the client computing device, the identifying information of the EMK, wherein receiving of the identifying information of the EMK at the application server from the client computing device is avoided;

verifying, using a certificate associated with the client computing device and stored at the platform verification server, whether the EMK of the client computing device is valid;

providing, from the platform verification server to the application server, a direct indication that the platform verification of the client computing device is successful in a case where the EMK of the client computing device is valid; and providing, from the platform verification server to the application server, a direct indication that the platform verification of the client computing device is unsuccessful in a case where the EMK of the client computing device is invalid.

14. The method of claim 13, further comprising:

transmitting, from the platform verification server to the client computing device, a request to verify that the client computing device verify that the client computing device is being accessed via a valid user account, the request to verify that the client computing device verify that the client computing device is being accessed via the valid user account comprising a request for identifying information of the EUK corresponding to the user account accessing the client computing device;

receiving, at the platform verification server and from the client computing device, the identifying information of the EUK;

verifying, using a certificate associated with the client computing device and stored at the platform verification server, whether the EUK is valid;

providing, from the platform verification server to the application server, the indication that the platform verification of the client computing device is successful in a case where the EUK of the client computing device is valid; and providing, to the application server, the indication that the platform verification of the client computing device is unsuccessful in a case where the EUK of the client computing device is invalid.

15. The method of claim 13, further comprising:

extracting, from the identifying information of the EMK, a signed public key and challenge (SPKAC) of the client computing device;

providing, to the application server, the SPKAC of the client computing device for creating, at the application server, a certificate for the client computing device.

16. The method of claim 15, further comprising:

signaling for providing, from the application server to the client computing device for installation at the client computing device, the certificate associated with the client computing device.

17. The method of claim 15, further comprising:

discarding, at the platform verification server, metadata in the identifying information of the EMK that is not relevant to the SPKAC; and signaling for the client computing device to discard the metadata in the identifying information of the EMK that is not relevant to the SPKAC.

18. The method of claim 13, wherein the identifying information of the EMK comprises a certificate or a proof-of-possession of the EMK.

19. The method of claim 13, wherein the indication that the platform verification of the client computing device is successful comprises a first Boolean value, and wherein the indication that the platform verification of the client computing device is unsuccessful comprises a second Boolean value different from the first Boolean value.

20. A non-transitory computer-readable medium comprising instructions which, when executed by one or more computers, cause the one or more computers to implement a method, the method comprising:

receiving, at a platform verification server and from an application server, a request for platform verification of a client computing device, the platform verification server being separate from the application server;

receiving, at the platform verification server and from the client computing device, identifying information of an enterprise machine key (EMK) of the client computing device, wherein receiving of the identifying information of the EMK at the application server from the client computing device is avoided, wherein the client computing device comprises a trusted platform module (TPM) storing an endorsement key (EK), an attestation identity key (AIK), the EMK, and an enterprise user key (EUK), the EMK being certified by the AIK, the EUK being certified by the AIK and associated with a user account of the client computing device;

verifying, using a certificate associated with the client computing device and stored at the platform verification server, whether the EMK of the client computing device is valid;

providing, from the platform verification server to the application server, a direct indication that the platform verification of the client computing device is successful in a case where the EMK of the client computing device is valid, while foregoing providing the identifying information of the EMK to the application server; and providing, from the platform verification server to the application server, a direct indication that the platform verification of the client computing device is unsuccessful in a case where the EMK of the client computing device is invalid, while foregoing providing the identifying information of the EMK to the application server.

* * * * *